March 12, 1940.   J. BERGMANS ET AL   2,192,886
OPTICAL SYSTEM
Filed July 16, 1936   3 Sheets-Sheet 2
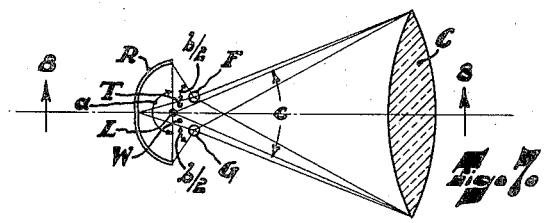
Fig. 7.
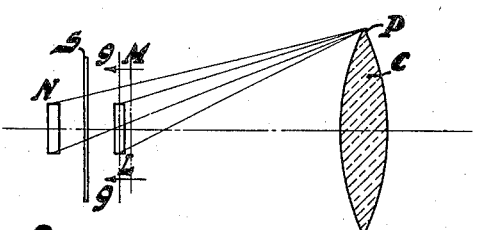 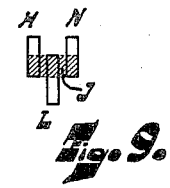
Fig. 8.   Fig. 9.
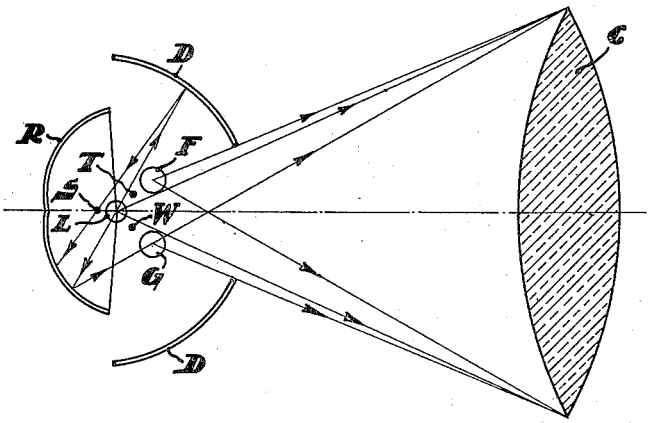
Fig. 10.
INVENTORS
J. BERGMANS,
P.M. VAN ALPHEN and
H. VAN DER VEEN
By E. F. Windroth
ATTORNEY Patented Mar. 12, 1940

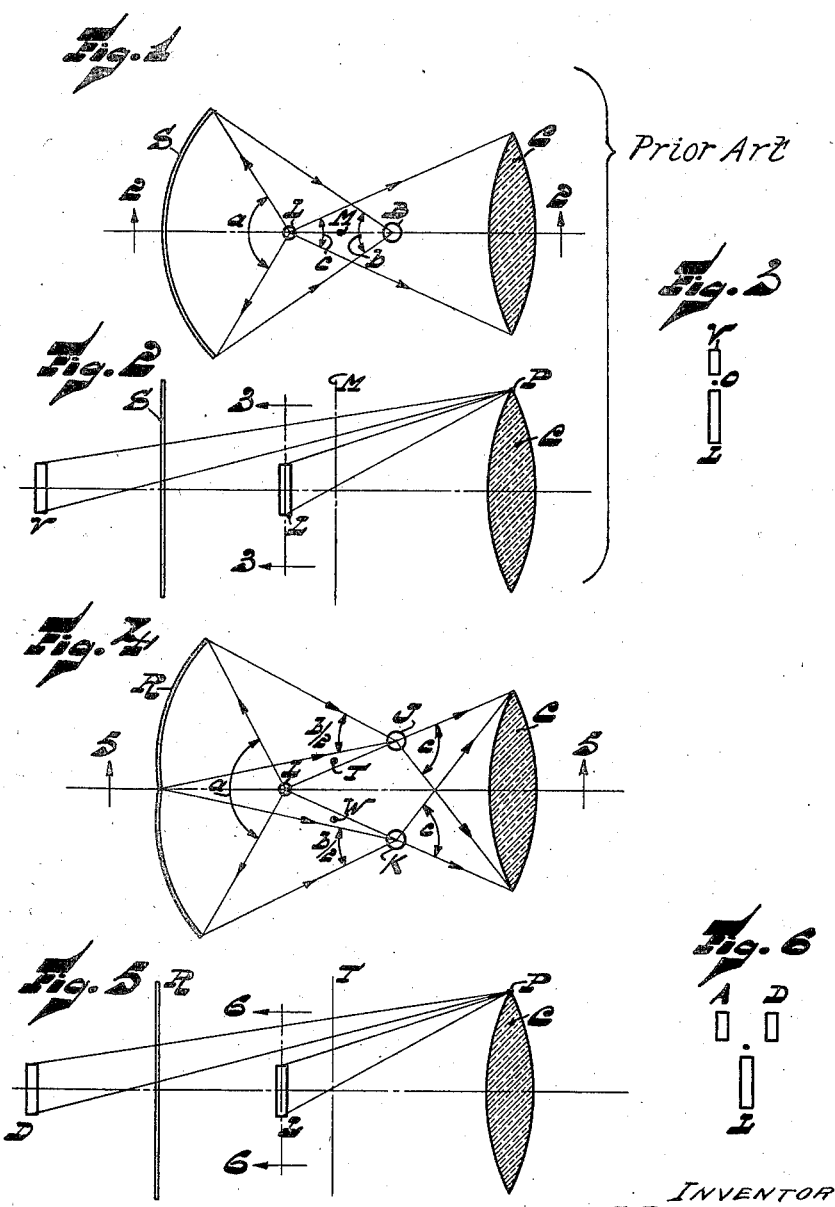

2,192,886

UNITED STATES PATENT OFFICE 2,192,886

OPTICAL SYSTEM

Jan Bergmans, Pieter Martinus van Alphen, and Hendrik van der Veen, Eindhoven, Netherlands, assignors to N. V. Philips' Gloeilampenfabrieken, Eindhoven, Netherlands Application July 16, 1936, Serial No. 90,980 In the Netherlands July 27, 1935

7 Claims. (Cl. 88—24)

Our invention relates to optical systems, and more particularly to optical systems in which a maximum amount of the light emitted by a linear discharge tube of the super-high-pressure-metal-vapor type is to be concentrated within a solid angle fully utilizable by a condenser system co-operating with the optical system. For this purpose a super high pressure mercury-vapor discharge tube is very suitable. Such tubes have been described in the U. S. application of Cornelis Bol, Willem Elenbaas and Hendricus Lemmens Ser. No. 46,952, filed Oct. 26, 1935, now Patent #2,094,694.

As our invention is particularly adapted for use in motion picture projecting apparatus, we shall describe same in this connection, however its use is not limited thereto. In such projecting apparatus it is very important to illuminate the film-gate as intensely and as uniformly as possible, and without the formation of images of the light source at this point. When using incandescent lamps, this is obtained by using a lamp having a filament formed of several turns arranged in a plane, in combination with a spherical reflector at the rear of the lamp, or on the wall thereof. As in most cases the center of curvature of the reflector coincides with the center of the filament, images of the filament turns are formed between the turns themselves, whereby a light-radiating surface of substantially uniform intensity is obtained.

However, difficulties arise when using the above mentioned linear light sources in such apparatus because the light from such sources must be distorted in some way to obtain a lighted surface of uniform light intensity. This could not be satisfactorily effected by the same method as used with incandescent lamps of the above type, because the linear light sources, due to their surrounding glass tubes, can not be spaced sufficiently close together. As a result, non-luminous gaps would occur in the light-emitting surface and the illumination of the film-gate would not be uniform.

The object of our invention is to overcome the above difficulties arising from the use of a super-high pressure metal vapour discharge tube, and to provide an optical system using a linear light source in which as much as possible of the light emitted therefrom is concentrated within a solid angle which can be utilized by the condenser system.

In accordance with our invention, we obtain a uniform and high-intensity illumination of the film-gate by disposing the above-mentioned linear light source in the immediate vicinity of a non-spherical reflecting surface whose centers of curvature lie in the immediate vicinity of the light-source. By this arrangement the images formed by the reflected light rays are located in the vicinity of the light-source, so that the lens- or mirror-condenser system can utilize at least the major portion of the light rays emitted by the light source and those emitted by the images.

By disposing the light source in this manner with respect to the reflecting surface, some important advantages are obtained. The images form, together with the light-source, a sufficient light-emitting surface without dark gaps which is suitable for the above-mentioned purposes, whereas the arrangement of the light-source in the vicinity of the reflecting surface assures a high efficiency of the light emitted by the light-source.

It is generally unnecessary to provide an increase in the longitudinal direction of a linear light source, as its length is usually sufficient for projecting purposes. However, it is desirable as mentioned above, to produce an increase, i. e. a thickening, normally to the axis and, for this reason, we use a substantially-cylindrical reflecting surface. Preferably the reflecting surface is given the form of a bent cylindrical mirror whose break perpendicularly intersects the axis of the system, and whose main direction, i. e. the direction of an element, is parallel to the longitudinal axis of the light source. However, the element may be slightly concaved to concentrate the light rays emitted by the light source into a beam extending in a direction parallel with the axis of the optical system.

By locating the light source outside the center of curvature of the reflecting surfaces, images of the light-source will not be formed in the light source itself and thus the reflected rays will not be absorbed by the discharge path. Discharge tubes of the super-high-pressure mercury-vapor type have the characteristic that their discharge paths strongly absorb any light rays falling there-on. Furthermore, by using a bent cylindrical reflector two enlarged images are formed in the immediate vicinity of the light source, whereby the light source and its images together act as a light-emitting surface.

As in some constructions of such tubes, the discharge path is eccentric with respect to the surrounding envelope, we prefer to so arrange the reflecting surfaces symmetrically with respect to the discharge path at a point at which the distance between the discharge path and the wall of the envelope is shortest.

When using cylindrical reflecting surfaces, the path of rays in a plane parallel to an element of the surface is not the same as the path of the rays in a plane normal to the element. To ensure that the images formed by rays in planes parallel to the elements lie in the immediate vicinity of the light source and thus that both the light emitted by the light source and the light radiated from its images can be utilized by the condenser system, or if desired by another system of lenses, we locate the reflector surface very near the light source.

To further enlarge the light source and its images in at least one direction, we may provide, in addition to the optical means referred to above, and between the light source and the condenser system refracting means, such as a cylindrical lens. This is preferably so effected that the solid angle of the light rays emitted by the light source and its images and intercepted by the refracting surfaces is larger—at least in the plane normal to the longitudinal axis of the light source—than the solid angle within which these high rays are directed after refraction.

To obtain a stronger concentration of the beam of emitted light, we may provide—in cooperation with the reflecting surface, and with or without the refracting means—further reflecting means such as a portion of a spherical mirror arranged symmetrically with respect to the axis of the system, to reduce the amount of light which otherwise would not strike the reflecting surfaces or reach the condenser surface referred to.

We are aware that it is known per se to position a linear light source outside the center line of curvature of a cooperating reflector for illuminating shop windows, however, this is not done for the purpose of obtaining a light-emitting surface which can be utilized by a condenser system.

In order that the invention may be clearly understood and readily carried into effect, we shall describe same more fully in reference to the accompanying drawings, in which:

Figure 1 is a sectional view of an optical system according to the prior art using a cylindrical reflector and a linear light source, Fig. 2 is a view taken along line 2—2 of Fig. 1, Fig. 3 is a view taken along line 3—3 of Fig. 2, Fig. 4 is a sectional view of an optical system according to the invention using a bent cylindrical reflector and linear light source, Fig. 5 is a view along line 5—5 of Fig. 4;

Fig. 6 is a view along line 6—6 of Fig. 5;

Fig. 7 is a sectional view of an optical system according to the invention,

Fig. 8 is a view along line 8—8 of Fig. 7,

Fig. 9 is a view along line 9—9 of Fig. 8,

Fig. 10 is a sectional view of an optical system similar to that shown in Fig. 7, but provided with side-mirrors.

Figure 11:
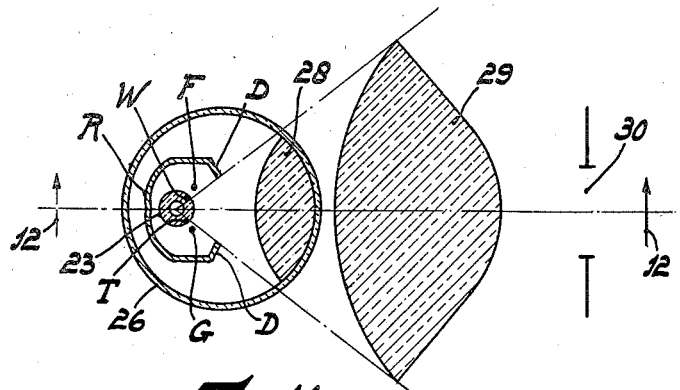
Fig. 11 is a sectional view of an optical system similar to Fig. 10 and shows a super-high-pressure discharge tube, refracting and cooling means and the film gate.

The prior art optical system shown in Figs. 1 and 2 comprises a condenser lens C, and a cylindrical reflector S having a center line of curvature M. Arranged at an arbitrary position between the reflector S and its center line of curvature M and with its longitudinal axis parallel to the line M is an elongated light source L. As shown in Figure 1, which is in a plane normal to an element of the reflector, it appears that the portion of the light emitted by source L and contained within a solid angle $a$ is intercepted by reflector S and is reflected thereby in a solid angle $b$ to form a thickened image B; the angle $b$ being smaller than angle $a$. As the source L lies considerably within the radius of curvature, image B lies at a comparatively large distance from the source L, and as a result condenser C cannot utilize both the light rays emitted by the light source L and by the image B. Furthermore, as the lens C can utilize only the light rays emitted by the light source L over an angle $c$, it appears that light rays emitted over an angle of 360°—angle $a$—angle $c$ are lost.

As shown in Fig. 2, reflector S acts in the plane of this figure as a flat reflector whereby a virtual image V is formed at the same distance behind the reflector as the light source is located in front of the reflector. As shown in Fig. 3, the light source L and the virtual image V, as viewed from an extreme point P of the condenser lens C, produce upon the plane 3—3 indicated in Fig. 2, a light emitting member having two separated portions. From Fig. 3 it is seen that this light-emitting member is unfavorable for the point P, as the optical center o has no light-emitting portion, but a dark gap exists between the image V and the light source L.

In the optical system shown in Fig. 4, a cylindrical reflector R is bent along a line parallel to the longitudinal axis of the light source L to form two cylindrical portions having center lines of curvature T and W. The light source L lies on the axis of the system and is spaced from the reflector portions by a distance considerably less than the radius of curvature. As the solid angle $a$, i. e. the solid angle of light emitted by source L and intercepted by the reflector R, is larger than the sum of the two solid angles $$\frac{b}{2}$$

i. e. the solid angle with which the reflector reflects the light, two enlarged images J and K of the light source will be formed at these points, each of which emit their light toward the condenser lens C over an angle $c$. However in such an arrangement a considerable amount of the light emitted by the light source L will be lost, and furthermore as the images J and K lie at comparatively great distances from the light source, the condenser lens C cannot utilize both the light rays emitted by the light source and those emitted by the images.

As shown in Fig. 5, two virtual images A and D are formed behind the bent reflector, only the image D appearing in this view. Fig. 6 shows the images A and D and the light source L, as observed from the extreme point P of the lens C and projected in a plane indicated by line 6—6 of Fig. 5. Also in this case the images are separated and there is no suitable brightly-lighted center portion, but a non-radiating center portion is formed between the images A—D and between the adjacent ends of the images A—D and L.

From the above it appears that to utilize the emitted light to the best advantage the solid angle of the light rays emitted by the light source and intercepted by the reflector must be as large as possible. Furthermore, when using a high-pressure mercury-vapor discharge tube whose discharge path strongly absorbs light rays falling thereon, it is advisable to produce two images of the light source by means of a bent mirror such as shown in Fig. 4.

To meet the above conditions, i. e., to utilize as much as possible of the light emitted by the light source and images, the images should lie in the immediate vicinity of the light source, and for this purpose we position the light source near the center line of curvature of the reflector. However, as an enlarged image of the light source is desirable, the light source is positioned within the radius of curvature, i. e. nearer to the reflector than are the center lines of curvature.

In order that the reflector will reflect the largest possible solid angle of the light emitted by the light source, the light source should be positioned close to the reflecting surface. For instance, the longitudinal axis of the light source should be not more than 1.5 centimeters from the nearest point of the reflector and not more than 4 centimeters from the most remote point of the reflector. In this case the light source and its image, when considered from an extreme point of the condenser lens, are brought much more closely together, which is very desirable for good luminous radiation.

The above is illustrated by the optical system according to the invention shown in Fig. 7. In this case the reflecting surfaces intercept a much larger angle $a$ of the directly-emitted light rays, as shown an angle of 180°, and then transforms these rays in this projection into two real images F and G which are enlarged due to the light source L being nearer the reflecting surface than are the center lines of curvature of T and W. As the images F and G lie very near the light source, it is possible for lens C to utilize a large portion of the light emitted by the light source L and by the real images F and G. Denoting by $c$, the solid angle within which the emitted light rays are directly radiated to condenser C, it appears that of the solid angle of 360°, within which a non-shielded linear light source emits light, only a solid angle of 360°—180°—angle $c$ of directly-radiated light is lost, which results in a much more efficient utilization of light than with the system of Figs. 1 and 4.

Further advantages of the optical system of Fig. 7 appear from Figs. 8 and 9. In the section of Fig. 8, the reflector acts as a flat mirror whereby two virtual images H and N (only N being visible in Fig. 8) are produced. By observing these images from the extreme point P of the condenser lens C, the resulting picture as shown in Fig. 9 is obtained on plane 9—9. Due to the short distance between the light source and the reflector, the adjacent ends of the images H—N and of the light source L are brought together and over-lap to form a substantially uniform luminous surface J, which may be used for film projection.

The optical system shown in Fig. 10 is similar to that of Fig. 7 with the exception that it is on an enlarged scale, and that means are provided to reduce to zero the solid angle within which the light rays of Fig. 7 for lighting the film gate are lost. These means comprise a spherical mirror D arranged so that the extreme light rays emitted from the images F—G can be utilized by the condenser lens, whereas the light rays which fall outside this solid angle and are not intercepted by reflector R are reflected by the spherical mirror D in the direction of light source L in order that they may be reflected toward the condenser lens by the reflector R. The center of curvature $s$ of the mirror D preferably lies at a point on the axis of the system between the mirror and the light source and in the immediate vicinity of the light source.

Figure 12:
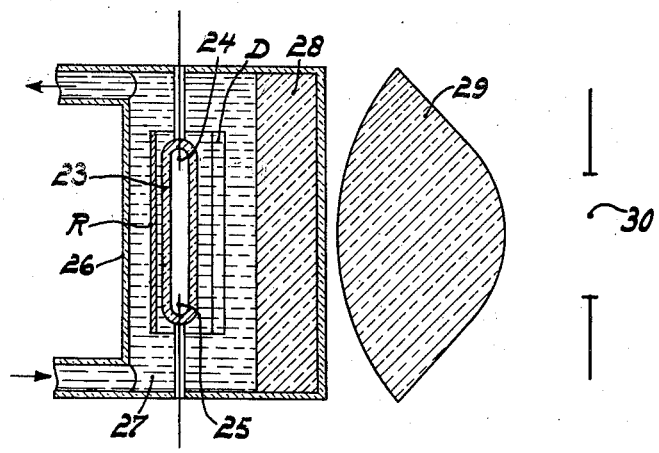
Fig. 12 is a view along line 12—12 of Fig. 11.

The optical system shown in Figs. 11 and 12 is in general similar to that of Fig. 7 with the exception that here the mirror D is a cylindrical one and is made in one piece with the reflector R. The cooling means will be described later with reference to Fig. 12. The discharge tube of the above-described type comprises a cylindrical envelope 23 of a transparent material such as quartz and two electrodes 24 and 25 hermetically sealed in the ends of this envelope and disposed to produce a discharge path excentric to the longitudinal axis of the envelope. As the discharge path is excentric in relation with the discharge tube it is possible to arrange this path in the immediate vicinity of the cylindrical reflector. Thus this surface may intercept over a large solid angle the light rays emitted by the light source. The tube has a filling of mercury vapour whose pressure during operation is greater than 6 atmospheres, preferably greater than 10 atmospheres and may be as high as 100 atmospheres. Surrounding the discharge-tube the reflector R and the mirrors D is a vessel 26 containing a circulating cooling medium 27, for instance water. It will be noted that the reflector R and the discharge tube are so arranged, that the distance between discharge path and the wall of the envelope facing the reflector is as short as possible.

To enlarge the light source in a direction normal to its longitudinal axis, refracting means are provided. As shown in Fig. 11 the refracting means consist of a cylindrical lens 28 having its element parallel to the axis of the light source and fixed to the inner wall of the tube 26. It is advisable to make the radius of curvature of the lens 28 smaller than the distance between the longitudinal axis of the discharge tube and the line of direction or element of the lens cutting the axis of the optical system. Preferably this distance does not exceed 4 centimeters. The lens 28 together with the cooling liquid serve to enlarge the light source in a direction normal to its axis. Further on the condenser lens 29 and the film gate 30 are represented.

Instead of using a separate reflector R, the back of the discharge tube may act as a mirror, care being taken that the discharge path does not coincide with the radius of the curvature of the mirror surface.

While we have described our invention in connection with specific examples and applications, we do not wish to be limited thereto but desire the appended claims to be construed as broadly as permissible in view of the prior art.

What we claim is:

1. An optical system comprising a high-pressure metal-vapor discharge tube having a linear discharge path serving as a light source, a light-condenser system located in front of said light source and having a substantially circular cross-section in a plane perpendicular to the axis of the optical system, and concave cylindrical reflecting means for producing at each side of the light source and adjacent thereto a linear image of the light source which is substantially parallel to the source and forms therewith a light-emitting surface, said reflecting means having two cylindrical surfaces disposed immediately behind said light source with their center lines of curvature lying adjacent to and on opposite sides of the light source substantially symmetrical with respect to the axis of the system.

2. An optical system comprising a high-pressure metal-vapor discharge tube having a linear discharge path serving as a light source, a light-condenser system located in front of said light source and having a substantially circular cross-section in a plane perpendicular to the axis of the optical system, and concave cylindrical reflecting means for producing at each side of the light source and adjacent thereto a linear image of the light source which is substantially parallel to the source and forms therewith a light-emitting surface, said reflecting means having two reflecting surfaces disposed immediately behind said light source with their center lines of curvature lying adjacent to and on opposite sides of the light source substantially symmetrical with respect to the axis of the system, each of said surfaces being a surface of revolution whose generatrix is a line parallel to light source and whose directrix is a circular arc.

3. An optical system comprising a high-pressure metal-vapor discharge tube having a linear discharge path serving as a light source, a light-condenser system located in front of said light source and having a substantially circular cross-section in a plane perpendicular to the axis of the optical system, and concave cylindrical reflecting means for producing at each side of the light source and adjacent thereto a linear image of the light source which is substantially parallel to the source and forms therewith a light-emitting surface, said reflecting means having two reflecting surfaces disposed immediately behind said light source, each of said surfaces being a surface of revolution whose generatrix is a straight line parallel to the light source and whose directrix is a portion of an ellipse having one focus at said light source.

4. An optical system comprising a linear light source, a condenser system having a substantially circular cross-section in a plane perpendicular to the axis of the optical system, and means for producing at points to the sides of the source and adjacent thereto two images of the source which form therewith a light-emitting surface, said means comprising a bent reflector having two reflecting surfaces disposed behind said source and concave toward the source, each of said surfaces being a surface of revolution whose generatrix is a straight line parallel to the axis of the light source and whose directrix is an arc.

5. An optical system comprising a high-pressure metal-vapor discharge tube having a linear discharge path serving as a light source, a light-condenser system located in front of said light source and having a substantially circular cross-section in a plane perpendicular to the axis of the optical system, and concave cylindrical reflecting means for producing at each side of the light source and adjacent thereto a linear image of the light source which is substantially parallel to the source and forms therewith a light-emitting surface, said reflecting means having two cylindrical surfaces disposed immediately behind said light source with their center lines of curvature lying adjacent to and on opposite sides of the light source substantially symmetrical with respect to the axis of the system, the distance from said light source, as measured in a plane perpendicular thereto, to the nearest point of each surface being less than 1.5 cms., and to the most remote point of each surface being less than 4 cms.

6. An optical system comprising a high-pressure metal-vapor discharge tube having a linear discharge path serving as a light source, a light-condenser system located in front of said light source and having a substantially circular cross-section in a plane perpendicular to the axis of the optical system, concave cylindrical reflecting means for producing at each side of the light source and adjacent thereto a linear image of the light source which is substantially parallel to the source and forms therewith a light-emitting surface, said reflecting means having two cylindrical surfaces disposed immediately behind said light source with their center lines of curvature lying adjacent to and on opposite sides of the light source substantially symmetrical with respect to the axis of the system, and light-refracting means between said light source and light-condenser system for enlarging the light source and images in one direction.

7. An optical system comprising a high-pressure metal-vapor discharge tube having a linear discharge path serving as a light source, a light-condenser system located in front of said light source and having a substantially circular cross-section in a plane perpendicular to the axis of the optical system, concave cylindrical reflecting means for producing at each side of the light source and adjacent thereto a linear image of the light source which is substantially parallel to the source and forms therewith a light-emitting surface, said reflecting means having two cylindrical surfaces disposed immediately behind said light source with their center lines of curvature lying adjacent to and on opposite sides of the light source substantially symmetrical with respect to the axis of the system, and light-reflecting means for reflecting toward said surfaces the otherwise wasted light rays leaving said light source.

JAN BERGMANS.
PIETER MARTINUS van ALPHEN.
HENDRIK van der VEEN.